United States Patent [19]

Zollinger et al.

[11] 4,293,606

[45] Oct. 6, 1981

[54] LOW FRICTION, ABRASION RESISTANT COATING FOR TRANSPARENT FILM

[75] Inventors: J. Lamar Zollinger, Maplewood; Larry A. Lien, Forest Lake, both of Minn.

[73] Assignee: Minnesota Mining and Manufacturing Company, St. Paul, Minn.

[21] Appl. No.: 885,762

[22] Filed: Mar. 13, 1978

[51] Int. Cl.$^3$ .......... B32B 3/00; B32B 7/14; B32B 27/38; B32B 9/04

[52] U.S. Cl. .......... 428/203; 427/386; 427/387; 428/332; 428/413; 428/447; 528/33

[58] Field of Search .......... 427/385 C, 386, 387; 428/417, 429, 447, 413, 203, 332; 528/33

[56] References Cited

U.S. PATENT DOCUMENTS

| | | | |
|---|---|---|---|
| 3,955,035 | 5/1976 | Ito et al. | 428/413 X |
| 3,998,991 | 12/1976 | Kaas | 428/413 X |
| 4,049,861 | 9/1977 | Nozari | 427/386 X |
| 4,069,368 | 1/1978 | Deyak et al. | 427/386 X |
| 4,084,021 | 4/1978 | Sandvig | 427/386 X |
| 4,100,134 | 7/1978 | Robins et al. | 528/10 |
| 4,101,513 | 7/1978 | Fox et al. | 526/193 |

*Primary Examiner*—Michael R. Lusignan

*Attorney, Agent, or Firm*—Cruzan Alexander; Donald M. Sell; Mark A. Litman

[57] ABSTRACT

Imaged transparent film which is carried by machinery is provided with a low friction, abrasion resistant coating which prevents the film from causing unnecessary drag when used with the machinery.

3 Claims, No Drawings

LOW FRICTION, ABRASION RESISTANT COATING FOR TRANSPARENT FILM

Imaged transparent film materials are often kept in a roll of continuous strips so as to facilitate access to individual frames or to provide a sequence of frames. Microfilms are often kept in strips or rolls for convenience of access, and motion pictures are provided in rolled strips or reels so as to enable the showing of frames in rapid sequence. Because movement of these frames is required to enable projection of the images for viewing, there is often a gradual deterioration of the image from abrasion and scratching which occurs during movement of the film against mechanical parts or hard surfaces. This is particularly true in a motion picture projector. This scratching can occur both on the imaging material itself (e.g., the developed emulsion layer) or on the film support. Scratching diminishes the attractiveness and lifespan of films and also reduces their worth. It would therefore be desirable to protect such films from abrasion and scratching, particularly transparent films which must be projected and moved into position on a projector.

There has been a recent improvement in abrasion resistant coating technology which is in part represented by U.S. Pat. Nos. 3,955,035; 4,026,826; and 4,049,861. Further advances are also disclosed in U.S. Patent Applications Ser. No. 764,817, filed Feb. 2, 1977, now U.S. Pat. No. 4,101,513, and U.S. Ser. No. 782,042, filed Mar. 28, 1977, now abandoned. These patents disclose the use of ambifunctional silanes (that is, compounds having both polymerizable silanes and other polymerizable groups such as epoxy, acryloxy [including methacryloxy], vinyl, and amino groups) in the formation of abrasion resistant coatings. Each of these monomers has its own particularly desirable aspects, and the monomers of concern in the present case are the epoxy-terminated silanes.

Epoxy-terminated silanes are compounds or materials having polymerizable (preferably terminal) epoxy groups and terminal, polymerizable silane groups, the bridging of these groups being through a non-hydrolyzable aliphatic, aromatic, or aliphatic and aromatic divalent hydrocarbon linkage which may have N and/or O atoms in the linkage chain. The O atoms for example would be within the chain only as ether linkages. These linkage chains may be generally substituted as is well known in the art, as these substituents on the chain do not greatly affect the functional ability of the epoxy-terminated silanes to undergo the essential reactions necessary for polymerization through the silane or epoxy terminal groups. Examples of substituents which may be present on the linkage or bridging moieties are groups such as $NO_2$, alkyl such as $CH_3(CH_2)_nCH_2$, alkoxy such as methoxy, halogen, etc. In the structural formulae appearing within this description of the invention, such substitution of the bridging moieties is implied as allowable unless specifically excluded by language such as "unsubstituted divalent hydrocarbon radical".

Examples of preferred epoxy-terminated silanes useful in the practice of this invention are compounds of the general formulae:

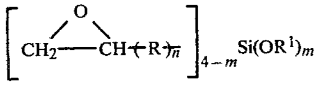
and

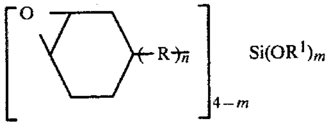

where R=a non-hydrolyzable divalent hydrocarbon radical (aliphatic, aromatic, or aliphatic and aromatic containing) of less than 20 carbon atoms or a divalent radical of less than 20 carbon atoms composed of C, H, N, S, and O atoms (these atoms are the only atoms which may appear in the backbone of the divalent radicals), the last being in the form of ether linkages. Preferably only O atoms may appear in the backbone in addition to carbon atoms. No two heteroatoms may be adjacent within the backbone of the divalent hydrocarbon radical and most preferably no heteroatom of R is directly bonded to the 1,2-epoxy ring of the formulae. This description defines divalent hydrocarbon radicals for epoxy terminated siloxanes in the practice of this invention. The value of n is from 0 to 1. $R^1$ is an aliphatic hydrocarbon radical of less than 10 carbon atoms, an acyl radical of less than 10 carbon atoms, or a radical of formula $(CH_2CH_2O)_kZ$ in which k is an integer of at least 1 and Z is hydrogen or an aliphatic hydrocarbon radical of less than 10 carbon atoms or hydrogen, m has values of 1 to 3.

The compositions employed in this invention can be an epoxy silane of the above formula in which R is any divalent hydrocarbon radical such as methylene, ethylene, decalene, phenylene, cyclohexylene, cyclopentylene, methylcyclohexylene, 2-ethylbutylene, and allene or an ether radical such as $—CH_2—CH_2—O—CH_2—CH_2—$, $(CH_2—CH_2O)_2—CH_2—CH_2—$,

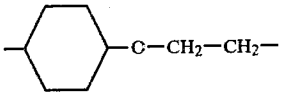

and $—CH_2O—(CH_2)_3—$, $R^1$ can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula $(CH_2CH_2O)_kZ$ in which k is an integer of at least 1, for example, 2, 5, and 8, and Z is hydrogen or any aliphatic hydrocarbon radical of less than 10 carbon atoms such as methyl, ethyl, isopropyl, butyl, vinyl and allyl.

In addition to any of the above silanes the compositions of this invention can be any hydrolyzate, prepolymer, or precondensate of the said silanes. The hydrolyzates can be formed by the partial or complete hydrolysis of the silane $OR^1$ groups. Thus the term precondensate includes siloxanes in which some of the silicon atoms are bonded through oxygen atoms. Prepolymers are formed by polymerization of the groups other than the silanes as in U.S. Ser. No. 782,079, filed Mar. 28, 1977, now U.S. Pat. No. 4,100,134.

The most preferred epoxy-terminated silanes are those of the formula

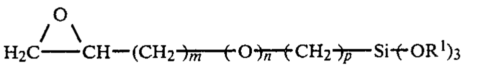

wherein m is 1 to 6 and most preferably 1 to 4, n is 0 or 1, preferably 1, p is 1 to 6 and most preferably 1 to 4, and $R^1$ is H or alkyl of 1 to 10 carbon atoms, most preferably alkyl of 1 to 4 carbon atoms.

The cured coatings of the present invention must comprise at least 30% by weight of epoxy-terminated silane in order to provide abrasion resistance, but other comonomers are useful and even desirable. Generally, any material which does not destroy the essential properties necessary to the coating (e.g., transmissivity, coefficient of dynamic friction, and abrasion resistance) is tolerable within the coating. Additives such as antistatic agents, ultraviolet radiation absorbers (e.g., benzophenones and benzotriazoles), flow control agents, flexibilizers, etc., are useful. Materials which react with either the epoxy or silane groups during cure are also useful and even desirable. Mono- and poly-epoxides, and particularly aliphatic mono-epoxides and poly-epoxides are particularly useful additives in compositions based on epoxy-terminated silanes in that they can improve the flexibility of the coating. This is particularly desirable in the coating of motion picture film.

The poly-epoxides particularly useful as comonomers would be generally represented by the formula:

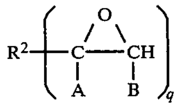

wherein $R^2$ is an aliphatic or cycloaliphatic radical, A and B are H or, when fused together, the atoms necessary to form a 5- or 6-membered cycloaliphatic ring, and q is the valence of $R^2$ and is preferably 1, 2, or 3 and most preferably is 2.

Additional preferred epoxy comonomers from within the above formula may be chosen from the formulae:

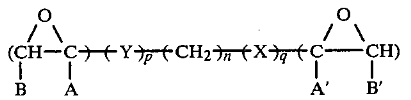

wherein n=1 to 6,

X and Y independently represent (1) $—O—(CH_2)_m—$, wherein m=1 or 2 and the terminal carbon atom of this group is directly connected to the carbon of the epoxy group, or (2)

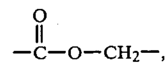

with the bond from the carbonyl carbon atom directly connected to the bridging group $—(CH_2)_n—$, p+q=1 or 2 and p and q are independently 0 or 1, A and B, and A' and B' are independently H or, when fused together as A and B or A' and B', the atoms necessary to form a 5- or 6-membered cycloaliphatic ring, and

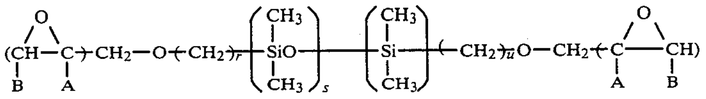

wherein A and B and A' and B' are as defined above r and u are independently integers of 1 to 6, and s is an integer of 1 to 6.

Alkylene and polyalkylene diols are also useful comonomers with the silane reactive materials of the present invention. Diethyleneglycol, triethylene glycol, polypropylene glycol, and polyethylene glycol are exemplary materials of this class. Materials having molecular weights between those of diethyleneglycol and decaethyleneglycol or dipropyleneglycol and decapropyleneglycol (i.e., 2 to 10 oxyalkylene units) are most preferred from this class.

Silanes, such as tetraethoxy silane, may also be copolymerized with the reactive materials. As stated before, the only limitation on additives and coreactants is that they do not destroy the necessary properties of the coating.

These materials form excellent abrasion resistant coatings and represent outstanding progress in the art. When used on film which is moved by mechanical operations, especially on motion picture film which must meet specific machine tolerances, significant problems were encountered. The abrasion resistant coating had far too high a level of surface friction, and when film having an epoxy-terminated silane abrasion resistant coating was moved through a projector, the film images fluttered on the screen as a result of 'chatter'. 'Chatter' is a term of art for film moving through the projector at a speed which is too slow or too fast, usually because of friction drag or too little friction. This causes a rolling or fluttering of the projected picture and often a chattering noise in the equipment.

It is a standard and customary procedure in the photographic industry to coat all motion picture film with a wax to prevent 'chatter', as even regular cinematographic film without an abrasion resistant coating has too much surface friction. This wax gives the film its smooth, glossy appearance. When this wax was applied to motion picture film having an epoxy-terminated silane derived abrasion resistant coating thereon, the wax formed a mottled, discontinuous coating on the surface. This helped reduce chatter, but was difficult to apply, did not completely eliminate the chatter problem, and gave an undesirable appearance to the film. The coating also wore off quickly because of poor adhesion between the coating and the wax.

In addition to the requirements of an abrasion resistant coating on motion picture film with regard to properties of friction, the coating must also be optically satisfactory. The transparent film with the abrasion resistant coating must be transmissive of at least 75% of all light between 400 and 780 nm that is transmitted through the film without the coating. Preferably at least 90% of this light is transmitted. As the coating also may extend over the sound portion of the film which is projected with infrared radiation, the sound area of the film with the abrasion resistant coating should also be at least equally transmissive of infrared radiation.

Any modification of the abrasion resistant coating composition or coating thereon used to reduce friction should not generate a mottled appearance on the film. Particularly, the coating with additives must pass the following test. A 0.3 to 0.4 cm thick sheet of clear glass is coated with the abrasion resistant coating, including the additives used to control the coefficient of friction, and cured to a final thickness of about 5 microns. The uncoated side of the glass is placed against a solid, smooth white background and 10 candle power illumination per square centimeter is projected through the coating to the white background. Any mottling which produces on an area of at least 1 $mm^2$ an optical density of greater than 0.30 (measured against a standard scale placed adjacent to the mottling) is excessive. 'Mottle free' according to the practice of this invention is defined as a coating which generates an optical density of no more than 0.30 according to this test, hereinafter referred to as the litzol test. Preferably an optical density of no more than 0.20 according to the litzol test is produced, and most preferably no more than 0.10.

The present invention teaches a composition of epoxy-terminated silanes on transparent imaged film which is both abrasion resistant and has lower frictional properties so that the film may be mechanically moved.

According to the present invention, transparent imaged film is coated on at least one face thereof with an abrasion resistant coating of from 0.5 to 15.0$\mu$. The coating is obtained from the cure of a composition, the reactive ingredients of which comprise at least 30% by weight of epoxy-terminated silane. The coating has a dynamic coefficient of friction against a smooth surface of tin plated steel of 0.05 to 0.30 and allows at least 75% transmission of light in the visible wavelengths, between 400 and 780 nm, which is transmitted by the uncoated film. The coating has a dynamic coefficient of friction against itself of less than 0.41. The coating itself should be transmissive of at least 75% of all visible light and preferably transmissive of at least 90% of visible light between 400 and 780 nm. Where the coating is used over an infrared projected image (e.g., the sound track), the coating should also be at least 50% and preferably 75% transmissive of infrared radiation. The coefficient of friction against smooth tin plated steel is preferably between 0.12 and 0.25.

The coefficient of friction ($\mu$) between two surfaces is the ratio of the force (F) required to move one surface in contact with a second surface to the total force (W) pressing the two surfaces together. This is independent of the surface area of contact within reasonable limits (e.g., the point of a pin pressing against and into a soft surface would not generate a coefficient of friction but rather a coefficient of drag). The formula definition of the coefficient of friction would thus be:

$$\mu = F/W.$$

The coefficient of friction may be conveniently determined by the use of an inclined plane apparatus where the relationship $\mu$ = tangent ($\theta$) is valid, where $\theta$ is the angle of inclination of the plane above the horizontal.

A particular apparatus was used to determine coefficients of friction in the present case. The surface to be tested (e.g., the film) is tautly fastened against a flat elongated surface which may be inclined. A beam-like element is particularly suitable. This element is hinged at one end and indicates the angle of inclination on an integral scale. An inverted U-shaped element (weighing 52.6 grams) of sufficient dimensions to easily straddle the beam-like element has a small tin plated steel wire (0.89 mm diameter) having a 2 mm radius of curvature attached to the center of the U-shaped member so that it extends 22 mm out from the member. Because of the central positioning of the curve in the wire, the U-shaped member may be balanced on the wire. The wire is placed against the film sample at the non-hinged end so that the curved wire is in contact with the film. The hinged beam-like element is slowly raised until the movable U-shaped member begins to slide. The coefficient of static friction is the tangent of the angle ($\theta$) at which the U-shaped member first begins to slide. This is repeated two or three times to determine an average value. The curved wire contact is cleaned with 1,2-dichloroethane between readings.

The coefficient of dynamic friction is measured in a similar way. The beam-like element with film is inclined and the movable U-shaped member is tapped to initiate movement. When the U-shaped member continues to move along the beam-like element, the inclination of the beam-like element is lowered to the minimum angle at which movement continues. Slip velocity at these minimum angles is typically about 0.7 mm/sec. Reference in the present invention to a dynamic coefficient of friction against tin plated steel specifically refers to values taken on such apparatus.

For measurement of film against film coefficients of friction, some film which is to be tested is bent tightly around the wire on the movable U-shaped member, taped in place, and the tests run otherwise identically to the foregoing procedure. Dynamic slip velocities here were typically in the range of 0.25 to 0.35 mm/sec. References to coefficients of friction of film against film specifically refer to values taken on the above-described apparatus.

This test has been published as the American National Standard Methods for detecting the degree of lubrication on processed photographic film by the paper-clip friction test and is known in the art as ANSI PH 1.47-1972. This test is used by the National Association of Photographic Manufactures, Inc., and the testing device is commercially available.

The abrasion resistant coating compositions based on these epoxy-terminated silane monomeric reactants must be modified in order to generate the desired properties. A coating derived from unmodified epoxy-terminated silanes has been found to consistently have too high a coefficient of friction. The two most preferred modifications are the inclusion of particulates to reduce the surface area of contact between the coating and the surface against which it is moved and the addition of compatible oligomeric or polymeric materials which reduce the surface friction without destroying abrasion resistance, causing mottling, or severely reducing transmissivity.

Addition of particulate material to the coating composition is a relatively simple and inexpensive procedure for modifying the frictional properties. The particles must be large enough and numerous enough to affect the contour of the surface and yet small enough and sparse enough to not create an intolerable visual defect in the projected image and not extend uncoated beyond the surface of the coating. If the particles are within a size range of 20 to 200% the thickness of the final coating, they will usually be satisfactory. Preferably they will be between 25 and 150% of that thickness (as discrete particles or if prone to agglomeration, as the agglomerated particles). Surprisingly, the composition of the particles is relatively unimportant. Even opaque materials such as clay particles (e.g., bentonite) and carbon black may be used. The particles are of such a size that there is no significant absorption (unless too many particles are present) and only tolerable light scattering occurs. Preferred particulates are those which are wetted by the coating composition and in particular, silica and titania based particles (from 30% to 100% silica and/or titania) are preferred.

As previously stated, the effect of the particles appears to be a reduction in the contacting surface area between the film and the surface against which it moves. Although the coefficient of friction is generally known to be independent of the surface area, the reduction of surface area in the present invention is effective in reducing the coefficient of friction. This is a surprising result. The surface area of contact is measured by pressing the coated flat film against a flat, smooth glass plate with about 20 g/cm$^2$ pressure. The surface area of contact with films containing particulates is reduced because of the contouring of the surface caused by the presence of particulate matter. The coating should generally cover the particles rather than allowing them to protrude. If the particles are smooth some protrusion is tolerable, but still not desirable. The reduction in the surface area of contact should be at least 15%. Reduction up to 98% has been achieved. Best results are experienced with a reduction of between 40 and 98% of the surface area. The amount of reduction will vary depending upon the final properties desired.

The coating may also be modified by the addition of compatible oligomers and polymers (preferably 0.01 to 25% by weight and most preferably 0.05 to 15% by weight) which reduce the coefficient of friction. These oligomers and polymers either may be independently present in the coating or may be coreacted into the polymer network formed in part by the epoxy-terminated silanes. The preferred class of materials which control the coefficient of friction are oligomers and polymers having at least 5% and preferably at least 20% by weight of siloxane units of the formula:

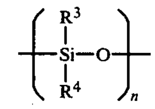

wherein $R^3$ and $R^4$ are independently selected from alkyl groups of 1 to 4 carbon atoms and phenyl groups having no more than 10 carbon atoms, and n is a positive whole integer of at least 1.

The description of a phenyl group having no more than 10 atoms is herein defined so as to include substituted phenyl groups such as o-chlorophenyl, tolyl, p-ethylphenyl, m-cyanobutylphenyl, 3,4-dimethylphenyl, naphthyl, etc. The preferred substituents are meta and para substituents of Cl, Br, and alkyl of 1 to 4 carbon atoms. The more preferred $R^3$ and $R^4$ groups are methyl, ethyl, propyl, butyl, phenyl, and tolyl. The most preferred $R^3$ and $R^4$ are methyl, ethyl and phenyl, with ethyl least preferred of the three.

Whatever the composition of these polymeric or oligomeric additives, certain determinable characteristics must be present in them, individually or in combination with other oligomeric and polymeric additives, to be useful in the practice of the present invention. Preferably, it has been found that the additives most useful in the present invention pass a defined compatibility test. The test is described below. Even though materials may properly reduce friction without mottling, materials which pass the following test are consistently preferred over materials that do not pass.

A standard solution of 10% by weight of cellulose acetate butyrate (viscosity of 0.4 sec. according to ASTM D-817-65 and 1.5 poise according to ASTM D-134-56, and having 2% acetyl and 47% butyryl content, as for example Eastman-Kodak CAB 553-0.4) in ethylacetate was prepared. The candidate material was dissolved in this solution at a weight ratio 5% compared to the cellulose acetate butyrate solids, and the solution coated onto a primed polyethyleneterephthalate film with a #8 wire-wound rod at about 2 microns thickness. The solution was then allowed to air dry overnight. The coefficient of friction was then determined according to ANSI PH 1.47-1972 (hereinafter described). The preferred materials are those which exhibit a coefficient of friction according to ANSI PH 1.47-1972 of less than 0.3 (preferably less than 0.27) at a slip rate greater than 0.5 cm/sec. This test, including the use of the defined polymer and testing procedure, is defined as and referred to as the Zollein test.

There are numerous catalyst systems which are useful in the preparation of the coatings of the present invention. In some of the systems, different catalysts have to be used for different parts of the reaction.

In curing systems based on epoxy-terminated silanes, the prior art recognizes the utility of a number of different classes of catalysts, some of which cure both the silane and the epoxy groups. U.S. Pat. No. 4,049,861 teaches the use of highly fluorinated aliphatic sulfonyl and sulfonic catalysts for the cure of epoxy-terminated silanes. U.S. Pat. No. 3,955,035 teaches Lewis and Bronstad acid catalysts for epoxy-terminated silanes, and U.S. patent application Ser. No. 764,817, filed Feb. 2, 1977, now U.S. Pat. No. 4,101,513, teaches the use of onium, radiation sensitive catalysts for epoxy-terminated silanes. All three of the classes cure both the epoxy and silane groups to varying degrees, and are the preferred catalysts for the epoxy-terminated silane compositions. Different catalysts, such as diazonium salts, are useful, and additional catalysts for individual groups may be added to be used in combination with these catalysts.

Reference to the following examples will enable a further understanding of the present invention.

EXAMPLES 1-9

These examples evaluate prior art compositions and various additives suggested in the prior art to show that the functional properties would be intolerable on coatings on film, particularly motion picture film. In all examples, 16 and 35 mm cellulose acetate based motion picture film was used as the substrate. The abrasion resistant coating, with or without additives, was applied to both sides of the film with a wire wound rod (using a #22 wire) and cured overnight at room temperature to a final thickness of 5.0μ for each coating. Examples 1-8 evaluate additive materials suggested by U.S. Pat. No. 3,955,035 and use what is believed to be one of the most effective catalysts suggested therein, $SbCl_5$. The following Table 1 shows the compositions used, and the dynamic coefficients of friction against tin-plated steel ($C_f$) and the coated film against itself ($C_{fi}$). The epoxy-terminated silane was γ-glycidoxypropyltrimethoxy silane in all cases and the catalyst was provided as a 10% by weight solution of $SbCl_5$ in $CH_2ClCH_2Cl$.

The grams of γ-glycidoxypropyltrimethoxy silane solids and weight percent of catalyst (to the epoxy-terminated silane) are shown in the following Table 1.

As will all examples in this application, unless otherwise stated, a final dry coating thickness of about 5 microns was used.

TABLE 1

| Ex. | Epoxy-Silane | Catalyst | Additive | Wt. % Additive | $C_f$ | $C_{fi}$ | Abrasion Resistance | Coating Quality |
|---|---|---|---|---|---|---|---|---|
| 1 | 5 | 0.25 | — | — | 0.46 | >0.5 | 8 | Rough |
| 2 | 3 | 0.6 | 3 PM | 20 | >0.4 | 0.33 | 2 | Hazy |
| 3 | 2 | 0.1 | 20 PM | 60 | 0.33 | 0.3 | 2 | Mottled-Haze |
| 4 | 2 | 0.1 | 20 CA | 50 | 0.34 | 0.35 | 2 | Mottled-Haze |
| 5 | 12 | 0.6 | 20 CA | 14 | 0.28 | >0.5 | 3 | Good |
| 6 | 23.5 | 1.0 | 15 CN | 6 | 0.39 | >0.5 | 4 | Good |
| 7 | 12 | 0.6 | 20 CN | 14 | 0.38 | >0.5 | 3 | Good |
| 8 | 2 | 0.1 | 20 CN | 50 | 0.28 | >0.5 | 2 | Good |
| 9 | 5 | 0.25 | .01 LS | 0.2 | 0.18 | 0.19 | 8 | Good |

In the above examples, PM represents polymethylmethacrylate (15% by weight in $(CH_2Cl)_2$), CA represents cellulose acetate (10% in methylethyl ketone), CN represents nitrocellulose (10% in isobutylacetate), and LS represents an organosilicone liquid of the formula

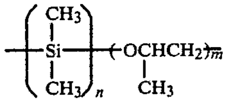

wherein n and m are whole integers of at least 2 whereby $\overline{M}_n = \sim 1500$, d=0.99, and the viscosity=125 centistokes at 25° C. The weight percent of siloxane units exceeds 20% by weight of the polymer. The numbers relating to abrasion resistance are qualitative evaluations based on a scale of 1-10, determined by visual inspection after 10 cycles of abrasion by 5 $cm^2$ of 0000 steel wool at 0.5 kg force. 10 would indicate no change, 8 indicates minimal visible scratching, 6 indicates noticeable but acceptable scratching, 4 indicates numerous visible scratching at an undesirable level but no damage to substrate, and 2 indiates damage to the substrate and poor abrasion resistance in the coating.

As can be seen from the above examples, the polymeric additives suggested by U.S. Pat. No. 3,955,035 do not provide acceptable coefficients of friction against either tin-plated steel or against the film itself and also tend to reduce the abrasion resistance of the coating significantly. Example 9, showing an additive of the present invention meets all criteria for use as a coating on moveable film.

EXAMPLES 10-13

The following examples show the use of particulate additives to the abrasion resistant coating to reduce the coefficient of friction of the coated film. The epoxy-terminated silane used was a mixture of γ-glycidoxypropyltrimethoxy silane and 1,4-butanediol diglycidylether (60/40 wt.%). The catalyst used was an ultraviolet radiation sensitive catalyst polyaryl sulfonium hexafluoroantimonate comprising a mixture of $((C_6H_5)_3SSbF_6)$ and 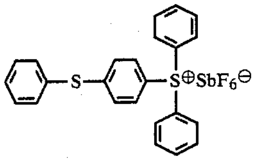

in about 50/50 molar proportions. The abrasion resistance in all cases was very good as was the optical quality of the coatings.

| Ex. | Epoxy-Silane Grams | Particulate Wt. % | Catalyst Wt. % | $C_f$ | $C_{fi}$ |
|---|---|---|---|---|---|
| 10 | 10 | 0.1 LV | 0.2 | 0.22 | <0.3 |
| 11 | 10 | 0.5 LV | 0.2 | 0.18 | <0.25 |
| 12 | 10 | 0.25 SY | 0.2 | 0.23 | <0.35 |
| 13 | 10 | 0.5 BN | 0.2 | 0.25 | <0.35 |

In the above examples, LV represents a precipitated silica particle having an average agglomerate size of 3.5 microns, SY represents a silica particle having a small amount of organic material bonded therein and having an average agglomerate size of 4 microns, and BN represents a trialkylaryl ammonium modified montmorillonite clay having a density of 1.8 and dispersed particle size of about 0.8×0.8×0.0025 microns. The individual particle size of the silicas are much less than 1 micron.

As can be seen from the above examples, all properties of the coated film are satisfactory. It is of interest to point out that the montmorillonite clay is an opaque material and yet still provided good optical qualities for the motion picture film. Transmissivity in all cases was well within required limits.

EXAMPLES 14-22

The following examples show the use of oligomeric or polymeric additives to the abrasion resistant coatings. The epoxy-terminated silane in Examples 14-16 is the same as in Examples 10-13. In Examples 17-19 mixtures of

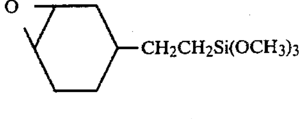

(hereinafter EP-2) and diethylene glycol were used, the weight ratio of silane to glycol appearing in parentheses. In Examples 20 and 21 mixtures of EP-2 and

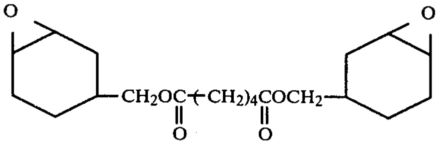

(hereinafter E-2) were used. In Example 22, EP-2, the epoxy silane of Example 1, diethylene glycol and E-2 were used, the numbers in parentheses respectively indicating the relative weight proportions. The catalyst in all cases was 0.2% triarylsulfonium hexafluoroantimonate. The additive SF in the examples indicates an oligomer of the formula

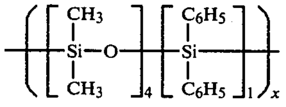

wherein x is such that viscosity of the oligomer is 45–65 centipoise at 25° C. and d=1.03.

| Ex. | Epoxy-Silane (Grams) | Additive (Wt. %) | $C_f$ | $C_{fi}$ |
|---|---|---|---|---|
| 14 | Uncoated Film | — | 0.34*/0.23 | >.45/>0.4 |
| 15 | 10 | 0.2 LS | 0.19 | 0.23 |
| 16 | 10 | 0.4 LS | 0.20 | <0.30 |
| 17 | 10 (9/1) | — | 0.33 | >0.40 |
| 18 | 10 (9/1) | 0.1 SF | 0.20 | 0.30 |
| 19 | 10 (9/1) | 0.2 LS | 0.23 | 0.33 |
| 20 | 10 (7/3) | 0.1 SF/0.2 LS | 0.18 | <0.30 |
| 21 | 10 (5/5) | 0.1 SF/0.2 LS | 0.15 | 0.25 |
| 22 | 10 (3/3/1/3) | 0.1 SF/0.2 LS | 0.17 | 0.30 |

*Top number indicates the coefficient of friction for the cellulose acetate base and the lower number indicates the coefficient of friction for the hardened gelatin emulsion.

All cures were accomplished in under 2 minutes using a 275 watt sun-lamp 16 cm from the coated surface. As can be seen from the above results, satisfactory frictional properties were obtained according to the practice of the present invention. Optical qualities and abrasion resistance were good in all examples. There was no mottling and transmissivity was very good.

EXAMPLE 23

7.82 grams of γ-glycidoxypropyltrimethoxy silane was partially hydrolyzed in ethanol (40% of methoxy groups removed) with hydrochloric acid. This was mixed with 1.96 grams of a polymer formed by the partial hydrolysis (50% of ethoxy groups removed) of diethoxydimethyl silane having a number average molecular weight of about 500 and ($\eta_D$) at 22° C. of 1.399. This polymer acted to reduce the coefficient of friction of the final coating. This composition was blended with 0.2 g of triaryl sulfonium hexafluoroantimonate, coated, and irradiated. The final coating was satisfactory according to all parameters concerning optical quality, abrasion resistance, and coefficients of friction.

EXAMPLES 24–25

U.S. Pat. No. 4,026,826 makes reference to the use of FC-430 surfactant in compositions which include polymers based on epoxy-terminated silanes. FC-430 is the tradename for an oligomeric fluorinated alkyl ester surfactant manufactured by 3M Company. This was evaluated for its effects on frictional properties of coatings based on epoxy-terminated silanes in this example.

To a composition containing 60 parts γ-glycidoxypropyltrimethoxy silane and 40 parts

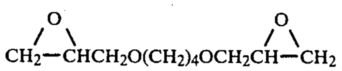

was added 2% by weight of the photosensitive catalyst of Examples 10–13. To one half of this composition was added 0.02% by weight of FC-430, to the other was added 0.3% by weight. Both compositions were coated onto cellulose acetate film and cured by two minutes of exposure of ultraviolet radiation.

The results in both cases showed dynamic coefficients of friction against tin-plated steel and for the film against itself above 0.4. U.S. Pat. No. 4,026,826 shows the use of approximately 0.01% by weight of this surfactant (e.g., Example 2). This surfactant did not produce coatings having the desired frictional properties. These examples are, of course, outside the scope of the present invention.

When materials described herein as reducing the frictional properties of abrasion resistant coatings were added to compositions containing this surfactant, frictional properties were brought within the required limits for usefulness on movable film, particularly for motion picture film.

EXAMPLES 26–31

The following examples evaluated other useful additives for reducing the coefficient of friction of abrasion resistant coatings on movable film. All compositions were coated onto 35 mm film on the emulsion side with a #3 wire wound rod and cured in the presence of the radiation sensitive catalyst of Examples 10–13 for 2 minutes with a 275 watt ultraviolet lamp to a dry thickness of about 8μ.

The compositions comprised 6 parts γ-glycidoxypropyltrimethoxy silane and 4 parts of the diepoxy of Examples 24 and 25. 0.2% by weight of the organosilicone liquid of Example 9 was used with the following materials: Example 26, 0.1% carbon black; Example 27, 0.1% titania dioxide; Example 28, 0.5% stearic acid; Example 29, 2% of

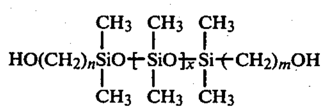

wherein m, n, and x are integers such that the composition has a viscosity of 320 centistokes at 25° C., a molecular weight of 2400, and an OH equivalent weight of 1200; Example 30, 2% of a sorbitan monostearate derivative having a 20 unit polyethyleneoxide chain thereon; Example 31, 1% of a sorbitan tristearate having a 20 unit polyethylene oxide chain thereon. The results were as follows:

| Ex. | $C_f$ | $C_{fi}$ |
|---|---|---|
| 26 | 0.18 | 0.15 |
| 27 | 0.18 | 0.15 |
| 28 | 0.12 | 0.23 |
| 29 | 0.15 | 0.05 |
| 30 | 0.21 | 0.25 |

-continued

| Ex. | $C_f$ | $C_{fi}$ |
|---|---|---|
| 31 | 0.16 | 0.25 |

Each of these materials was useful in reducing the coefficients of friction for the abrasion resistant coatings of the present invention.

Coating compositions of the present invention containing mixtures of the linear epoxy-terminated silanes and the cycloaliphatic epoxy-terminated silanes described above are desirable compositions. The cycloaliphatic comonomers tend to increase the flexibility of the final coatings which is usually desirable.

EXAMPLES 32-43

The following Table 2 shows the correlation of acceptability of materials with successful passage of the test. Materials must pass the ANSI test at a slip rate of about 0.5 cm/sec. or greater to successfully qualify as a preferred additive. These materials were coated out as previously described for the screening of candidate materials.

TABLE 2

| | | Coefficient of Friction | | | |
|---|---|---|---|---|---|
| Example | Material | AR coated Film ANSI | Film /Film | 5% in CAB ANSI | Pass + /Fail 0 |
| 32 | FC-430 | 0.4 | >0.5 | 0.32 | 0 |
| 33 | LS | 0.15 | 0.19 | 0.20 | + |
| 34 | SF | 0.17 | 0.07 | 0.22 | + |
| 35 | QS | 0.15 | 0.05 | 0.15 | + |
| 36 | MS | 0.21 | — | 0.27 | + |
| 37 | KS | 0.19 | 0.28 | 0.37 | 0 |
| 38 | NJ | 0.20 | 0.25 | 0.28 | + |
| 39 | SA | 0.12 | 0.23 | 0.25 | + |
| 40 | PE | 0.29 | 0.50 | 0.27 | 0 |
| 41 | TS | 0.16 | 0.14 | 0.37 | 0 |
| 42 | LE | 0.13 | 0.02 | 0.22 | + |
| 43 | ME | 0.20 | 0.15 | 0.4 | 0 |

The symbols above represent materials as described previously. In addition, QS represents

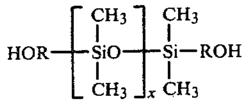

having a viscosity of 320 centistokes at 25° C., a molecular weight of 2400 and OH equivalent weight of 1200 and wherein R is an aliphatic group, MS is a 50% hydrolyzed product of $(CH_3)_2Si(OCH_2CH_3)_2$, KS is $(CF_2CFCl)_n$ wherein n is a whole integer greater than 2, NJ is paraffin oil, SA is stearic acid, PE is polyethylacrylate, TS is sorbitan monostearate having a 20 unit polyethylene oxide chain thereon, LE is

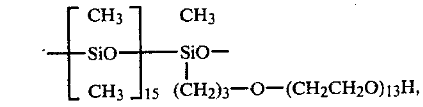

and

ME is a cyclic tetradimethylsiloxane of the formula:

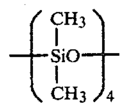

As can be seen from the above results, certain materials which provided low coefficients of friction in the abrasion resistant coating of previous examples did not pass the preferred screening test. In actual practice, these additives worked but did not perform as well as preferred materials which passed the test. Example 43 shows a material which does not pass the preferred screening test by itself, but it is found to be very desirable when used in combination with other materials and passes the preferred screening test in such combinations. Example 40 displayed a slip rate of less than 0.1 cm/sec. and failed the preferred screening test for that reason. This test is believed to accurately screen preferred materials.

What is claimed is:

1. A transparent, imaged motion picture film having on at least one face thereof a mottle free abrasion resistance coating of from 0.5 to 15.0μ on at least one face of said film, said coating resulting from the cure of a composition comprising at least 30% by weight of an epoxy-terminated silane, said coating:

(1) having a coefficient of friction against tin-plated steel of from 0.05 to 0.30, as measured by ANSI PH 1.47-1972, (2) having a dynamic coefficient of friction against said coating of less than 0.41, and (3) allowing at least 75% transmission of all radiation between 400 and 780 nm which is transmitted by said imaged film without said coating, wherein said epoxy-terminated silane is represented by the formula:

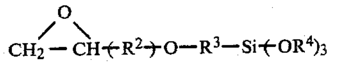

wherein $R^2$ and $R^3$ are independently alkylene groups of 1 to 4 carbon atoms, and $R^4$ is alkyl of 1 to 4 carbon atoms, and wherein said coating contains from 0.05 to 15.0% by weight of the coating of an oligomeric or polymeric material having at least 5% by weight of said material comprised of siloxane units of the formula:

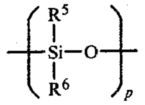

wherein $R^5$ and $R^6$ are independently selected from alkyl groups of 1 to 4 carbon atoms and phenyl groups having no more than 10 carbon atoms, and p is a positive whole integer of at least 1.

2. The film of claim 1 wherein $R^5$ and $R^6$ are independently selected from methyl, ethyl, propyl, butyl, phenyl, and tolyl.

3. The film of claim 1 wherein $R^5$ and $R^6$ are independently selected from methyl and phenyl.

* * * * *